No. 741,252. PATENTED OCT. 13, 1903.
F. LAMBERT.
WATER METER.
APPLICATION FILED APR. 28, 1902.
NO MODEL. 2 SHEETS—SHEET 1.

Attest:
Geo H Botts
Mabelle F. Lake

Inventor:
Frank Lambert
By Edith J. Griswold
Atty.

No. 741,252. PATENTED OCT. 13, 1903.
F. LAMBERT.
WATER METER.
APPLICATION FILED APR. 28, 1902.
NO MODEL. 2 SHEETS—SHEET 2.

Attest:
Geo H Bott
Mabelle F. Lake

Inventor:
Frank Lambert
By Edith J. Griswold
Atty.

No. 741,252. Patented October 13, 1903.

UNITED STATES PATENT OFFICE.

FRANK LAMBERT, OF BROOKLYN, NEW YORK.

WATER-METER.

SPECIFICATION forming part of Letters Patent No. 741,252, dated October 13, 1903.

Application filed April 28, 1902. Serial No. 105,061. (No model.)

*To all whom it may concern:*

Be it known that I, FRANK LAMBERT, a citizen of the United States, and a resident of New York city, borough of Brooklyn, Kings county, State of New York, have invented Improvements in Water-Meters, of which the following is a specification.

This invention relates to water-meters, and more particularly to meters having a measuring-chamber in an external pressure shell or casing.

The object of this invention is to construct a meter in which the parts will be maintained in the normal relative positions during a predetermined internal pressure, but under a greater internal pressure, due to expansion from freezing of the contents or from any other cause, the parts will separate and prevent the bursting of the meter. By the present construction this releasing of the parts, caused by supernormal internal pressure, takes place without any distortion of the meter, the parts being held together by frictional means capable of withstanding a predetermined pressure, but adapted to be driven out of position by a greater pressure.

In the accompanying drawings I have shown several different constructions to illustrate the principle of my invention, but I do not limit myself to the forms here shown.

Figure 1:
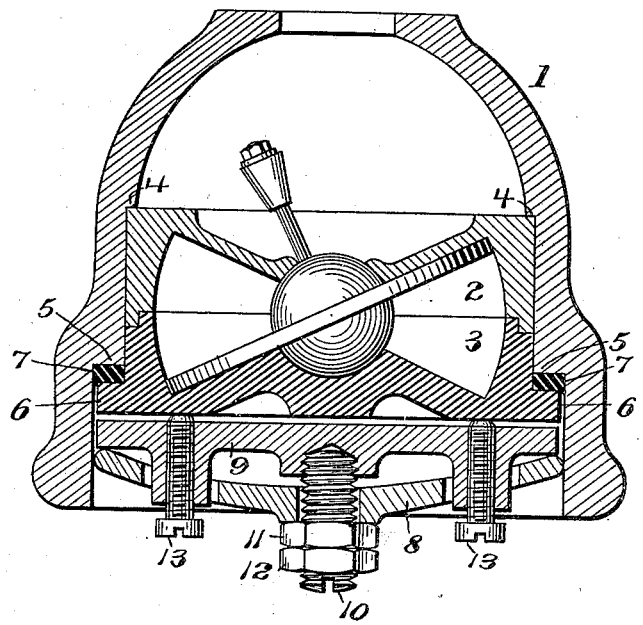
Figure 2:
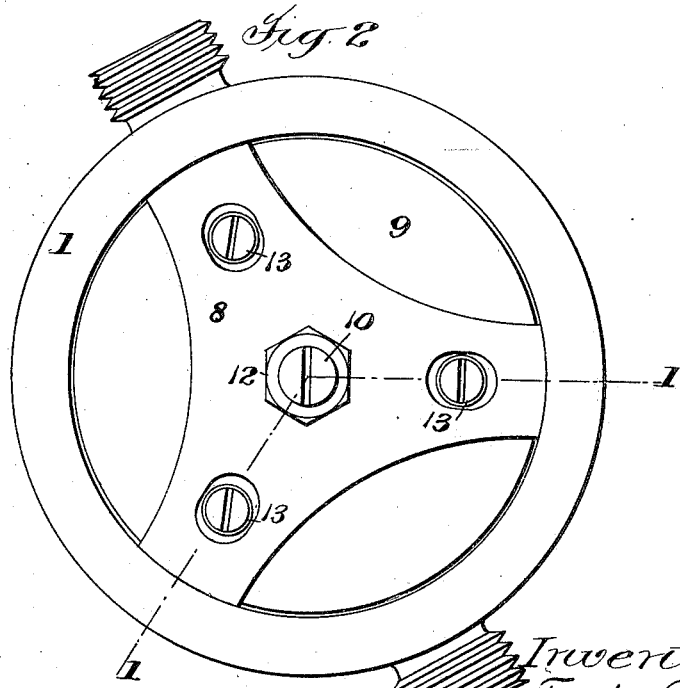
Figure 3:
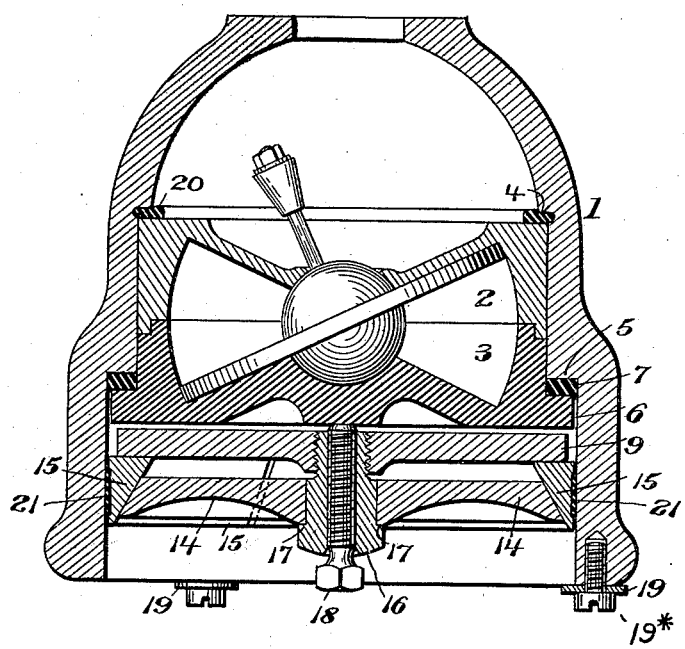
Figure 4:
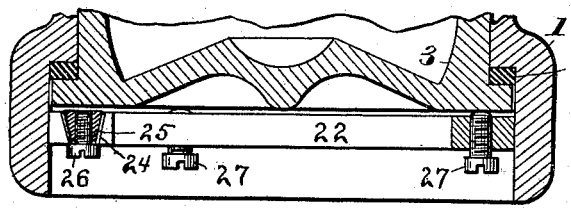
Figure 5:
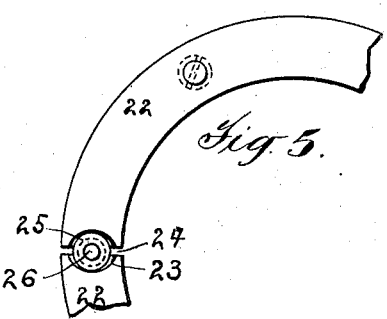

Figure 1 is a central sectional elevation of so much of a meter as is necessary to illustrate my invention, the lower part of the casing and the parts contained therein being shown as if taken on the broken line 1 1 of Fig. 2 for clearness. Fig. 2 is a bottom plan view of Fig. 1. Fig. 3 is a central sectional elevation of a meter, showing a modification of my invention. Fig. 4 is a sectional view of a portion of a meter, showing another modification. Fig. 5 is a detail view of a part shown in Fig. 4.

The generic construction and operation of meters of the kind here shown are so well known that a description thereof is omitted.

Referring to Fig. 1, the external casing 1 is formed with an opening for the admission of the measuring-chamber 2 3, which is closely but freely fitted in the bored portion of the casing 1, the said chamber being stopped in normal position by its upper face coming in contact with a shoulder 4 in the casing. The measuring-chamber may consist of any number of sections, the construction here shown having two sections. A water-tight joint between the casing and the measuring-chamber is formed by interposing between a shoulder 5 on the casing and a flange 6 on the measuring-chamber a packing-ring 7.

The frictional clamping device, as shown in Figs. 1 and 2, may consist of an expansion-piece 8, made of metal, hard rubber, or other suitable material, preferably having an outline similar to that shown in plan in Fig. 2—that is, having arms only that extend to the circumference and being in cross-section curved or dish-shaped, as shown in Fig. 1—a plate 9, loose within the opening in the casing 1, and means for drawing the two parts 8 and 9 together, with the concave side of the piece 8 against the plate 9, whereby the piece 8 will flatten out and its outer edges come into frictional contact with the inner wall of the opening in the casing 1. The intensity of the friction between the expansion-piece 8 and this casing 1 will vary with the amount of flattening given the expansion-piece 8 against the rigid plate 9, and this can readily be adjusted by drawing and holding the parts 8 and 9 together by a proper screw. However, after the meter leaves the factory, where proper adjustment of the tension can be made and tested, it is generally taken apart by inspectors or others, and it is important that means be provided for keeping the friction constant after it has been once adjusted to resist a predetermined internal pressure. Such means may consist of the arrangement shown in Figs. 1 and 2. A screw 10 is screwed into the rigid plate 9 as far as it will go, its outer end projecting through a central opening in the expansion-piece 8. An adjusting-nut 11, screwing onto screw 10 and bearing against the central part of the expansion-piece 8 to draw it closer to the plate 9, causes the piece 8 to be flattened against the plate 9 and expand, so that the outer edges of the piece 8 will bind against the inner face of the casing 1 with an amount of friction proportional to the degree of flattening from the normal curvature of the piece 8.

When the adjusting-nut 11 has been tightened up sufficiently to give the requisite degree of frictional intensity to the piece 8, so that it will withstand a predetermined pressure, a check-nut 12 is screwed on tight. Then when it is necessary to take the meter apart the screw 10 is unscrewed from its bearing in the plate 9 without changing the position of the adjusting and check nuts 11 and 12 to release the expansion-piece 8, and when the meter is again put together and the screw 10 screwed home the adjusting-nut 11 will have caused an expansion of the piece 8 to the same degree as originally given it.

Screws 13, screwing into and through plate 9, serve to force the measuring-chamber 2 3 into proper position to compress the packing 7 to form a water-tight joint for closing the casing 1.

The operation is as follows: The meter parts are placed in position, the screw 10 screwed home in the plate 9, and the adjusting-nut 11 screwed up until the piece 8 binds against the casing 1. The screws 13 are then tightened against the measuring-chamber to close the joint 5 6 7 properly. Then by adjusting the nut 11 under tests the intensity of the friction of the expansion-clamp is brought up to a predetermined point—that is, the clamp is made to withstand a certain degree of internal pressure without moving, but not to stand a greater pressure. This predetermined point is safely beyond the water-pressure service. Then when a supernormal internal pressure occurs from freezing or other cause the entire measuring-chamber or the lower section only may be forced out of place, driving the friction-clamp downward. In other words, when the internal pressure reaches a point that the friction-clamp will not stand this friction-clamp gives and allows the sections 2 and 3 to move apart and increase the content or cubic space in the measuring-chamber and also allows the whole measuring-chamber to move downward, and thus increase the content or cubic space in the pressure-casing.

Fig. 3 shows a modification of the frictional clamping means. A rigid disk 14 and a split ring 15, surrounding the disk, take the place of the expansion-piece 8, the said ring and disk having contiguous faces cut to such a bevel that as the disk 14 is drawn nearer to the plate 9, against which the ring 15 bears, as shown, the disk will bear against the ring in such a direction as to cause the latter to expand and bind against the casing 1. The split ring may be of metal or hard rubber. The ring 15 is represented as of metal faced with soft material 21, such as rubber or leather, so that the friction will take place between metal and soft material. This facing is not essential. The screw 16 passes freely through a central opening in the disk 14 and has a shoulder 17 bearing against the disk 14 to force the latter toward the plate 9 when screw 16 is screwed into this plate. A screw 18, screwing into and through the external screw 16, is made to bear against the measuring-chamber 2 3 to force it to its seat, as explained in reference to screws 13 in Fig. 1, after the friction-clamp has been tightened by the external screw 16. If desired to prevent the friction-clamp and measuring-chamber from dropping or being forced completely out of the casing 1, suitable means may be adopted. As shown in Fig. 3, washers 19, secured to the bottom of casing 1 by screws 19*, project within the circumference of the opening of the casing. This Fig. 3 shows elastic packing 20 between the shoulder 4 of the casing and section 2 of the measuring-chamber, but the arrangements of packing 7 and 20 in connection with the flanged chamber form part of and are claimed in a separate application, Serial No. 105,059.

In Figs. 4 and 5 a very simple and reliable arrangement is shown. It consists of an expansion-ring 22, having a taper hole 23 drilled and a radial slit 24 cut through the ring, the said slit passing through the center of the taper hole. A taper nut 25, inserted in the hole, can be drawn by the screw 26 to force the split ring to expand in tight contact with the internal wall of the pressure-casing. By making the angle of the taper nut very acute an enormous pressure against the casing can be obtained. The three screws 27 are to force the measuring-chamber to its seat after the expansion-ring has been fastened into position.

The frictional means for holding the parts together against internal pressure, the device for adjusting the intensity of the friction, and the screws for pressing the chamber into place and tightening the joint may be greatly modified or any other forms of frictional means, adjusting and tightening devices, may be used without departing from my invention.

By slightly tapering the outlet of the casing, with the smaller end outward, it will be evident that the tension on the friction-clamp will be increased as it is driven outward.

I claim as my invention—

1. In a water-meter, an external casing, a measuring-chamber, and an expansion device for holding said chamber in said casing by friction.

2. In a water-meter, an external casing, a measuring-chamber and frictional means for holding said chamber in said casing against internal pressure, the intensity of the friction of said means being adjustable to the internal pressure to be resisted by said measuring-chamber.

3. In a water-meter, an external casing, a measuring-chamber and a frictional device for holding said chamber in said casing against internal pressure, means for adjusting the intensity of the friction of said device to the internal pressure to be resisted by said measuring-chamber, said means adapted to keep said friction constant after it has once been adjusted to resist a predetermined internal pressure.

4. In a water-meter, an external casing, mounted therein a measuring-chamber formed of a plurality of sections and frictional means for holding said sections close together in said external casing, the parts being so arranged that with undue pressure the sections of the measuring-chamber may be forced out of the external casing and the various sections of the measuring-chamber be free to part.

5. In a water-meter, an external casing, a measuring-chamber and frictional means for holding said chamber in said casing against internal pressure, said means and casing being so constructed that when in operative engagement said means are capable of a rectilinear motion without rotation.

In testimony whereof I have signed my name to this specification in the presence of two subscribing witnesses.

FRANK LAMBERT.

Witnesses:
EDITH J. GRISWOLD,
MABELLE F. LAKE.